Patented Nov. 14, 1933

1,935,176

UNITED STATES PATENT OFFICE 1,935,176

METHOD OF MAKING GELS

Gerald C. Connolly, Baltimore, Md., assignor to The Silica Gel Corporation, Baltimore, Md., a corporation of Maryland No Drawing. Application April 16, 1930
Serial No. 444,881

5 Claims. (Cl. 252—2)

The present invention relates to highly porous low density gels and methods of making the same.

The principal object of the present invention is to obtain a heat stable gel having a low apparent density.

The method of making such a low density gel according to this invention consists in preparing a washed hydrogel in any suitable manner, impregnating it with a volatile substance, and then drying the impregnated hydrogel to convert it into the hard porous gel and drive off the volatile substance.

The density of the final product may be controlled by the amount of the volatile substance used to impregnate the hydrogel, and also by the temperature of the water employed to wash the hydrogel, or by both of these factors.

Methods of producing low density gels are known, but the products will not withstand high temperature activation without a material increase in the apparent density.

In some processes employing silica gel, it is necessary to activate at relatively high temperatures, for instance, where silica gel is employed for refining lubricating oils, it is very advantageous, for economical reasons, to be able to activate at high temperatures, in order to remove the last traces of heavy carbonaceous material from the gel. Of course the density can be kept constant by resorting to the use of naphthas, instead of heat, for extracting the residual oil from the spent gel, but this is not desirable. Prior gels that can be kept at the desired low apparent density after repeated activations, have too poor physical structure to withstand the hard usage occurring in plant operation.

According to the present invention, it is possible to produce a gel having the desired low apparent density and which is substantially heat stable, that is to say, the apparent density is not materially increased by repeated activations at high temperatures.

In one method of making the gel of this invention, a washed hydrogel or jelly is prepared. This may be done in any suitable manner, for instance, according to the Patrick Patent No. 1,297,724, by adding, with agitation, a solution of sodium silicate to an equal volume of an acid solution, such as a 10% solution by weight of hydrochloric acid, the specific gravity of the silicate solution being about 1.185. The ratio of $SiO_2$ to $Na_2O$ in the silicate solution may be as in any commercial solution, about 3.25 to 1. This reaction mixture, or sol, is allowed to set to a hydrogel or jelly which is washed with water to remove the salt and acid. The temperature of the wash water may range from 105° F. to 175° F., for instance, 105° F., 125° F., 140° F., 150° F., 165° F., or 175° F., but preferably 150° F.

The hydrogel is then impregnated with a substance which is volatilized by heat. For this purpose the hydrogel is treated with a solution of a volatilizable salt as by soaking or immersing the hydrogel in the solution for the necessary time. The volatilizable salts may be ammonium sulphate, ammonium chloride, ammonium nitrate and the like. In fact, any salts which are volatile or readily decompose into volatile components when heated may be used.

The amount of the volatilizable salt present in the hydrogel after impregnation determines the apparent density of the final product. If the hydrogel is charged with a large amount of volatile salt, the apparent density of the final product will be lower than when a lesser amount is used. Thus, by varying the amount of volatile salt with which the hydrogel is charged it is possible to control the apparent density of the final product.

Another factor which affects the apparent density of the final product is the temperature of the water employed in washing the hydrogel prior to impregnation. A hydrogel washed with water at 150° F. charged with a large amount of the volatile salt gives a final product having a fixed low apparent density. A hydrogel washed with water at 105° F. charged with the same amount of the volatile salt, gives a final product having a slightly higher apparent density. By impregnating the 105° F. washed hydrogel with a greater amount of the volatile salt than that used for impregnating the 150° F. washed hydrogel it is possible to obtain final products having the same apparent densities.

When using ammonium chloride the hydrogel after being washed preferably with water at 150° F., is soaked in a 20% solution of said salt for about 14 hours and then drained. It is then dried by heating slowly to a temperature of 212° F., which is slowly increased to 500° to 600° F., for instance, to completely volatilize the salt. Thus, the drying converts the hydrogel into a dehydrated vitreous porous gel, and at the same time causes the volatilization of all of the ammonium chloride. The volatilized salt liberated during the drying may be recovered and reused to impregnate more hydrogel.

The strength of the ammonium chloride or other impregnating solution may be varied according to convenience.

The term "apparent density" as used herein, means the weight in grams of a cubic centimeter of gel consisting of particles of a predetermined size, in this instance 200 to 300 mesh particles. By this is meant, that all the particles will pass through a 200 mesh sieve but will be caught on a 300 mesh sieve.

Gels made according to the process of this invention are better decolorizers than prior gels, besides being very effective carriers for catalysts.

Having thus described the invention, what is claimed as new and desired to be secured by Letters Patent is:

1. The process of making a hard, porous gel of low apparent density, consisting in preparing a washed hydrogel of the type described, impregnating it with a volatile salt, and drying the impregnated hydrogel to convert the hydrogel into a hard porous gel and liberate the volatile salt.

2. The process of making a hard, porous gel of low apparent density, consisting in preparing a washed hydrogel of the type described, impregnating it with a volatile ammonium salt, and drying the impregnated hydrogel to convert the hydrogel into a hard porous gel and liberate the volatile substance.

3. The process of making a hard, porous gel of low apparent density, consisting in preparing a washed hydrogel of the type described, impregnating it with ammonium chloride, and drying the impregnated hydrogel to convert the hydrogel into a hard porous gel and liberate the ammonium chloride.

4. The process of making a hard, porous gel of low apparent density, consisting in preparing a hydrogel, washing it with water at 105° to 175° F. to remove the soluble matter therefrom, impregnating the washed hydrogel with a volatile ammonium salt, converting the hydrogel into a hard, porous gel and liberating the said salt.

5. The process according to claim 4 wherein the volatile ammonium salt is ammonium chloride.

GERALD C. CONNOLLY.